(12) United States Patent
Pu et al.

(10) Patent No.: US 10,107,628 B2
(45) Date of Patent: Oct. 23, 2018

(54) METHOD AND APPARATUS FOR NAVIGATING ON ARTISTIC MAPS

(75) Inventors: Kent Qing Pu, San Diego, CA (US);
Ivan Angelov, Del Mar, CA (US);
David Thieme, Laguna Niguel, CA (US)

(73) Assignee: Infogation Corporation, San Diego, CA (US)

( * ) Notice: Subject to any disclaimer, the term of this patent is extended or adjusted under 35 U.S.C. 154(b) by 1815 days.

(21) Appl. No.: 12/186,524

(22) Filed: Aug. 6, 2008

(65) Prior Publication Data

US 2011/0130955 A1   Jun. 2, 2011

Related U.S. Application Data

(60) Provisional application No. 60/955,343, filed on Aug. 11, 2007.

(51) Int. Cl.
*G01C 21/20* (2006.01)
*G01C 21/36* (2006.01)
*G09B 29/00* (2006.01)

(52) U.S. Cl.
CPC ......... *G01C 21/20* (2013.01); *G01C 21/3614* (2013.01); *G01C 21/3667* (2013.01); *G09B 29/007* (2013.01)

(58) Field of Classification Search
CPC .......................... G01C 21/20; G01C 21/3614; G01C 21/3667; G09B 29/007
USPC ......................................................... 701/200
See application file for complete search history.

(56) References Cited

U.S. PATENT DOCUMENTS

| | | | |
|---|---|---|---|
| 6,697,734 B1 * | 2/2004 | Suomela | 701/212 |
| 2005/0149303 A1 * | 7/2005 | Agrawala et al. | 703/2 |
| 2006/0206264 A1 * | 9/2006 | Rasmussen | 701/212 |
| 2007/0176932 A1 * | 8/2007 | Salmre | 345/440 |

FOREIGN PATENT DOCUMENTS

DE   10 2005 020152   11/2006

* cited by examiner

*Primary Examiner* — Christopher L Gilligan
(74) *Attorney, Agent, or Firm* — Joe Zheng

(57) ABSTRACT

Techniques for navigating an artistic map are disclosed. The artistic map is often non-linear scaled, which means the map includes various objects being exaggeratedly shown. When a point of an object is selected as a destination, the coordinates of the point is captured. The coordinates of the point are then transformed to a physical point represented by latitude and longitude. A direction from a current location to the physical point is determined. Subsequently, the direction is modified or transformed in accordance with the map being displayed.

20 Claims, 8 Drawing Sheets

— scaled to mile original image     deformed image 1     deformed image 2     deformed image 3

METHOD AND APPARATUS FOR NAVIGATING ON ARTISTIC MAPS

CROSS-REFERENCE TO RELATED APPLICATION

This application claims the benefits of U.S. provisional application No. 60/955,343, entitled "Navigation on artistic maps", filed on Aug. 11, 2007, which is hereby incorporated by reference for all purposes.

FIELD OF THE INVENTION

The present invention is generally related to the area of Global Positioning System (GPS). In particular, the present invention is related to navigation on non-linearly scaled maps and how to display such non-linearly scaled maps with proper colors on a display screen.

BACKGROUND OF RELATED ART

The Global Positioning System (GPS) is the only fully functional Global Navigation Satellite System (GNSS). Utilizing a constellation of at least 24 medium Earth orbit satellites that transmit precise microwave signals, the system enables a GPS receiver to determine its location, speed and direction.

A GPS receiver calculates its position by measuring the distance between itself and three or more GPS satellites. Measuring the time delay between transmission and reception of each GPS microwave signal gives the distance to each satellite, since the signal travels at a known speed. The signals also carry information about the locations of the satellites. By determining the position of, and distance to, at least three satellites, the receiver can compute its position using trilateration.

GPS receivers are being widely used in automobiles and help drivers find where they want to go. It is often observed that the GPS displays only the road the driver is on when a driver is in a remote area without much surroundings. Such a display not only is boring but also fails to tell where the driver may be located with respect to the destination, unless the actual mileage is read and calculated over the total distance.

GPS receivers are also getting popular in leisure activities, such as touring a city, a park and a zoo. Travellers by looking at the actual maps being displayed may find their ways to a desired point of interest. However, unless the map is displayed at a certain resolution and a distance to the point of interest is very short, the point of interest may not be even displayed in a map. All the user sees are the roads and unrelated landmarks until the user is getting sufficiently close to the point of interest.

The present invention discloses techniques of navigating on a non-linearly scaled map, where the non-linearly scaled map shows exaggeratedly points of interest. One of the benefits, advantages, and objects of the present invention is to allow users to navigate easily from one point to another point.

The present invention may be advantageously used in leisure activities, such as touring a city, a park or a zoo, where landmarks, point of interests, or animals may be exaggeratedly shown to help a user of a GPS receiver locate what is desired to see. A map being used in the present invention may be artisticly made to make the navigation as a pleasant experience.

SUMMARY

This section is for the purpose of summarizing some aspects of embodiments of the present invention and to briefly introduce some preferred embodiments. Simplifications or omissions in this section as well as in the title and the abstract of this disclosure may be made to avoid obscuring the purpose of the section, the title and the abstract. Such simplifications or omissions are not intended to limit the scope of the present invention.

Broadly speaking, embodiments of the invention relate to techniques for providing a navigation experience on a non-linearly scaled map, wherein the map may show exaggeratedly objects (or points of interest) to help a user locate where he/she is and visit what he/she needs to visit. The techniques described herein are related to each other and each is believed independently novel in the art. The disclosed techniques may be performed alone or in any combination to provide a novel and unobvious system or a portion of a system. It should be understood that the techniques in combination yield an equally independently novel combination as well, even if combined in their broadest sense; i.e. with less than the specific manner in which each of the techniques has been reduced to practice.

According to one aspect of the present invention, some of the techniques, when properly combined, provide a mechanism to display an artistic map with exaggeratedly shown objects. According to one aspect of the present invention, the artistic map is non-linearly scaled. When a point of an object is selected as a destination, the coordinates of the point is captured. The coordinates of the point are then transformed to a physical point represented by latitude and longitude (e.g., used in geospatial representation or GPS data). A direction from a current location to the physical point is determined. Subsequently, the direction is modified or transformed in accordance with the map being displayed.

The present invention may be implemented in different forms including a method, a product and a part of a system. According to one embodiment, the present invention is a method for navigating a particular area, the method comprises: providing a map that is non-linearly scaled, the map including various objects being exaggeratedly shown; capturing coordinates of a point selected on one of the objects; transforming the coordinates to a physical point represented by latitude and longitude; determining a direction from a current location to the physical point; and synchronizing the direction with the map being displayed. The map corresponds to a geographical map, where the physical point can be fairly precisely located in accordance with the latitude and longitude.

According to another embodiment, the present invention a portable device for navigating a designed place, the portable device comprises: a display screen configured to display a map including various objects being exaggeratedly shown; a memory for storing code; a processor executing the code to perform operations of: capturing coordinates of a point selected on one of the objects in the map being displayed; transforming the coordinates of the point to a physical point represented by latitude and longitude; determining a direction from a current location to the physical point; and synchronizing the direction with the map being displayed.

There are many objects, features, and advantages in the present invention, which will become apparent upon examining the following detailed description of embodiments thereof, taken in conjunction with the attached drawings.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The detailed description of the invention is presented largely in terms of procedures, steps, logic blocks, processing, and other symbolic representations that directly or indirectly resemble the operations of data processing devices. These process descriptions and representations are typically used by those skilled in the art to most effectively convey the substance of their work to others skilled in the art. Numerous specific details are set forth in order to provide a thorough understanding of the present invention. However, it will become obvious to those skilled in the art that the present invention may be practiced without these specific details. In other instances, well known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Figure 1:
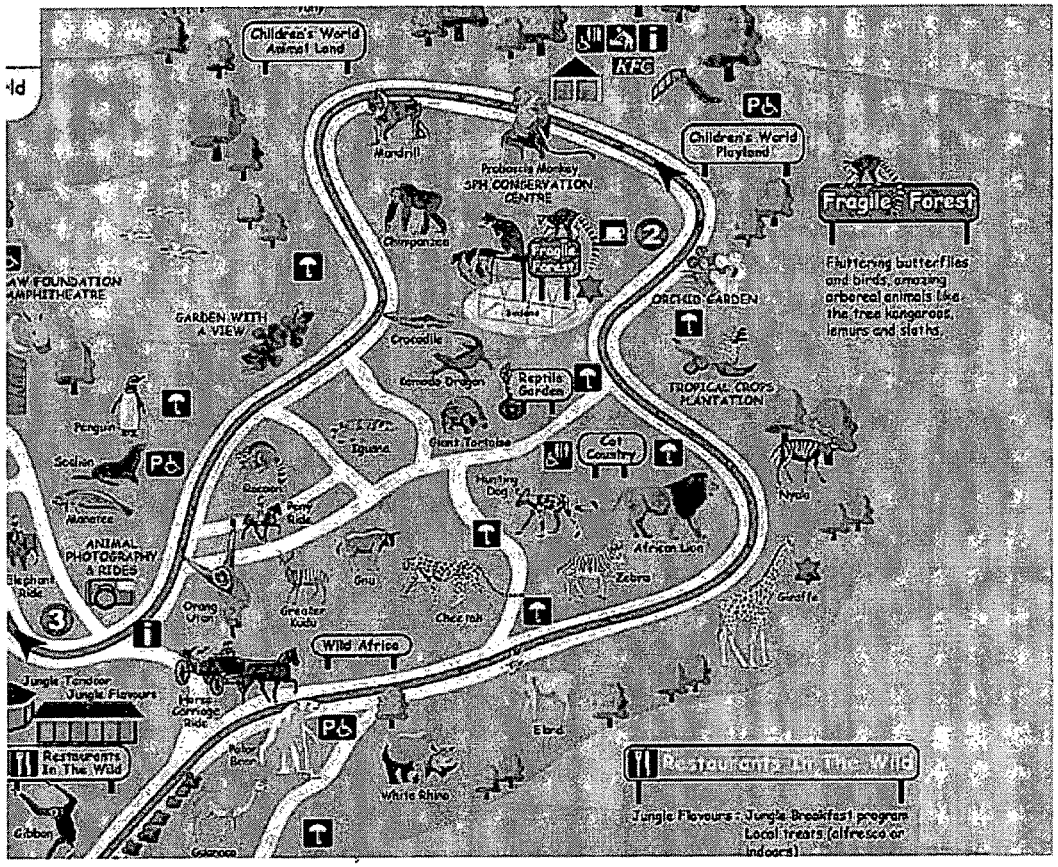
FIG. 1 shows an exemplary map of a zoo.

Referring now to the drawings, in which like numerals refer to like parts throughout the several views. FIG. 1 shows an exemplary map 100 of a zoo. The map 100 is artistic and non-linearly scaled, where points of interests are exaggeratedly displayed to assist a visitor to locate what is desired to be seen. Such a map may be provided electronically by the zoo. The map 100 may be in a specific format readable by a GPS receiver. Examples of such a specific format include GPs eXchange file format (.gpx) and Garmin Point of Interest file format (.gpi). The map 100 in a data file may be downloadable to a portable device or a personal computer that can be configured to perform as a GSP receiver. The map 100 in a data file may be also transportable in a medium. Regardless how the map 100 is loaded, a GPS receiver is configured to display the map 100 on its display screen and allow a user thereof to navigate in the map 100 (e.g., from a current location to a desired location).

Figure 2:
FIG. 2 shows an exemplary image including a plurality of segments, each segment being labeled and represented by a few pairs of coordinates in latitude and longitude.

A map used in a GPS receiver is constructed based on GPS data. Every point in the map is represented by a pair of latitude and longitude. Different from the prior art system that operates on such a map, one embodiment of the present invention uses a map that is constructed by segments and points. A segment includes a collection of points. FIG. 2 shows an exemplary image 200 including a plurality of segments; each segment is labeled and represented by only one pair of latitude and longitude. In other words, regardless of its size in a map, any part of a segment means one or few points in the map. As will be described below, a mapping process is performed to ensure that a GPS receiver calculates or determines exactly the location of a segment in an actual map by a pair of latitude and longitude.

Figure 3:
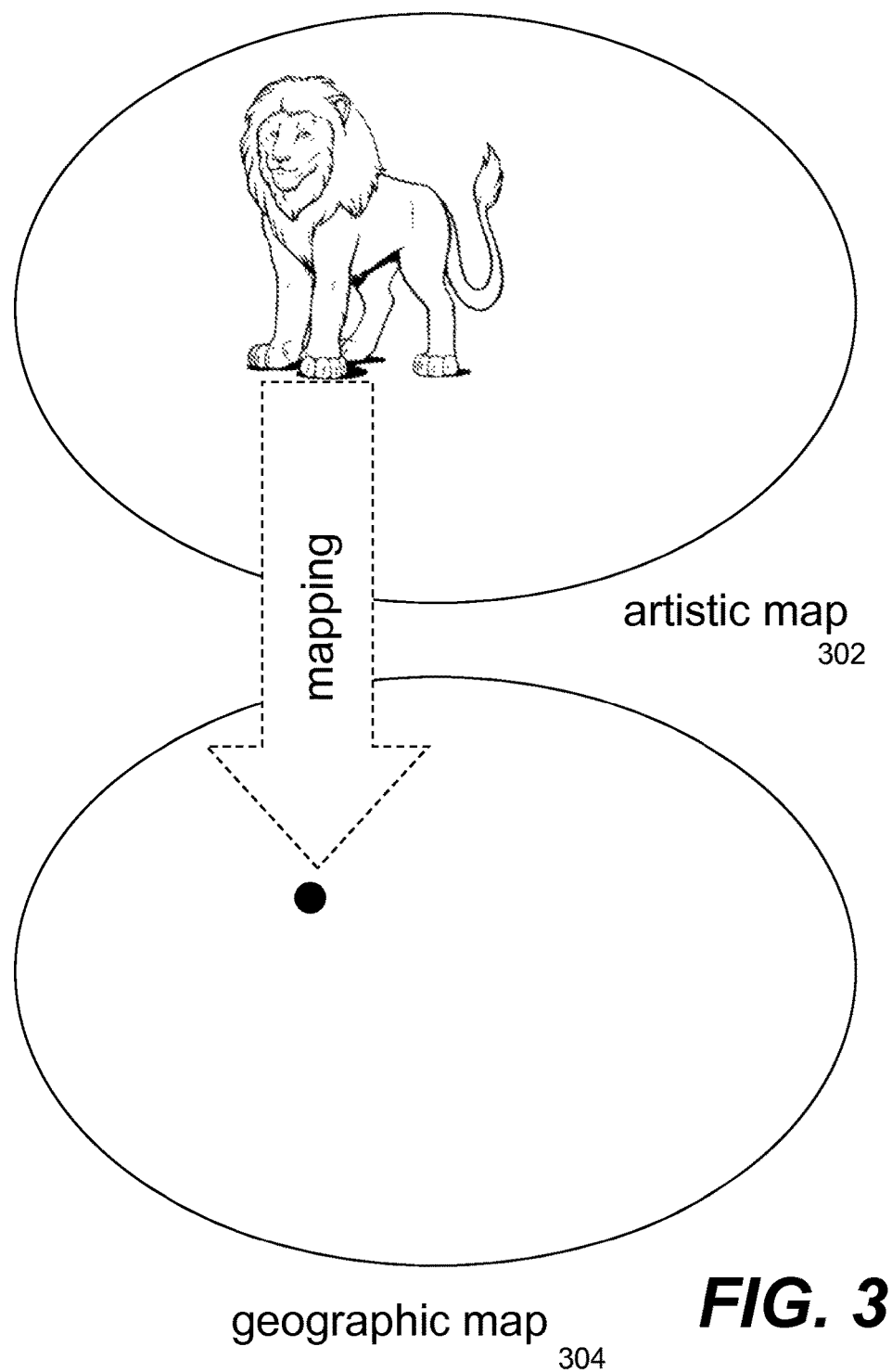
FIG. 3 shows an example of mapping between an artistic map and an actual geographical map.

FIG. 3 shows an example of mapping between an artistic map 302 and an actual geographical map 304. The artistic map 302 may represent a touring map provided by a zoo and shows graphically where the animals are located in the zoo. To demonstrate the outlines of the zoo clearly, such a map may not be linearly scaled. The animals are even exaggeratedly shown on the map 302 to show their respective exhibits. However, each exhibit occupies an area in artistic map 302 that may be only a point in the geographical map 304. In one embodiment, the artistic map 302 covers the same area as the geographical map 304 does. Every point in the artistic map 302 is supposed to be represented by a pair of latitude and longitude but grouped in segments to represent single points of interest (POIs), each of the POIs is represented by a pair of latitude and longitude. In other words, no matter where a point is located in the artistic map 302, as long as it is in a segment, it is only represented by a pair of latitude and longitude representing the segment.

In referring to a zoo, displaying an artistic map of the zoo helps a visitor to find the location of a particular animal to see. However, such an artistic map would not work with a GPS receiver as it projects a physical point represented by coordinates in latitude and longitude in the real world to a corresponding point represented by Cartesian coordinates in an actual geographic map. In one embodiment, points in any part of an object or segment in the artistic map are collectively represented by a pair of Cartesian coordinates. FIG. 3 shows that an object "lion" in the artistic map is represented by one point in the actual geographic map. In other words, any point in the object "lion" means a single location in the actual geographic map.

When the artistic zoo map is displayed on a GPS receiver, a user desires to visit the loin exhibit and points to the object "lion" in the map being displayed. Through an underlying mapping processing, the GPS is configured to know that a location in the actual geographic map is identified and show the routes towards that location.

Figure 4A:
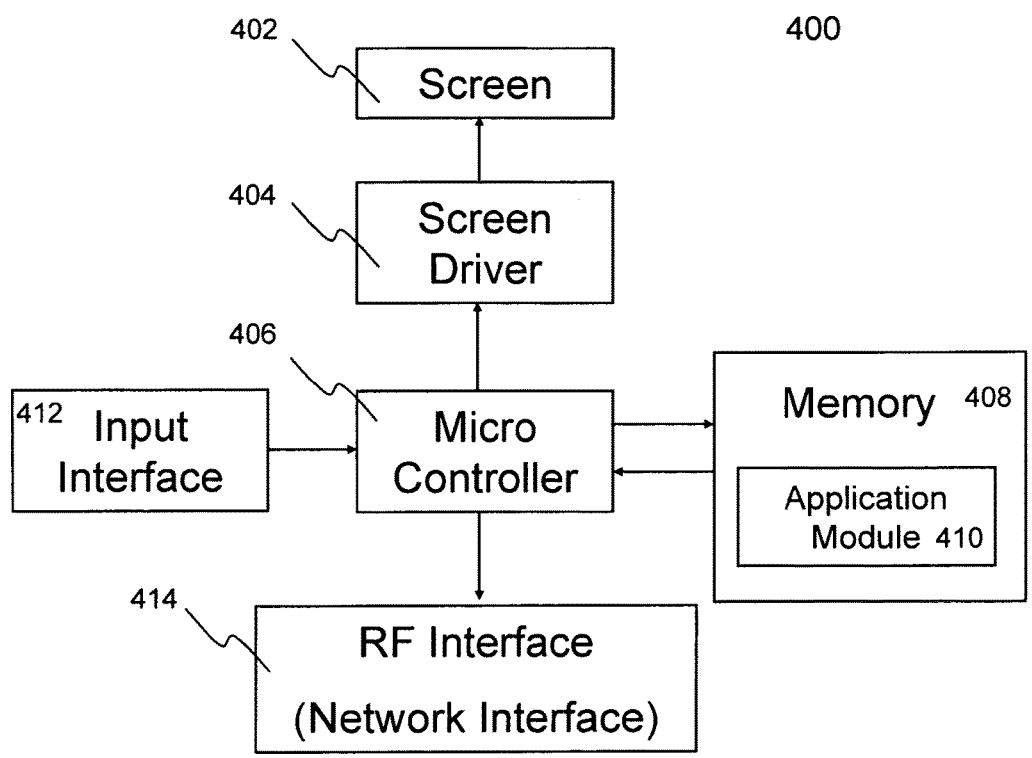
FIG. 4A shows an internal functional block diagram of an exemplary GPS receiver or a portable device configurable to be a GPS receiver.

FIG. 4A shows an internal functional block diagram of an exemplary GPS receiver 400 or a portable device configurable to be a GPS receiver. The display screen 402 may be a screen (e.g., LCD or touchable). The screen 402 communicates with and is commanded by a screen driver 404 that is controlled by a microcontroller (e.g., a processor) 406. The memory 408 may be loaded with one or more application modules 410 that can be executed by the microcontroller 406 with or without a user input via the user interface 412 to achieve desired tasks. In one embodiment, an application module is configured to facilitate a mapping process from coordinates in one map to coordinates in another map. In another embodiment, an application module is configured to map coordinates in an artistic map to a point represented by a pair of latitude and longitude. In operation, when the microcontroller 406 executes one of the application modules 410, the screen driver 404 generates control signals to drive screen 402 to display an application specific user interface accordingly.

In one exemplary application, the screen 402 displays an artistic map showing various objects of interest. The objects and map are not linearly scaled. A user of the device 400 may select any one of the objects as a destination. Each of the objects, regardless of its size, is inherently represented by only a point or a pair of coordinates. So regardless where the object is pointed at, the microcontroller 406 locates the object as a corresponding destination in a real geographic map and presents the directions to the destination. The directions may be presented in audio, video or other instruction with respect to the map being displayed on the screen 402.

Figure 4B:
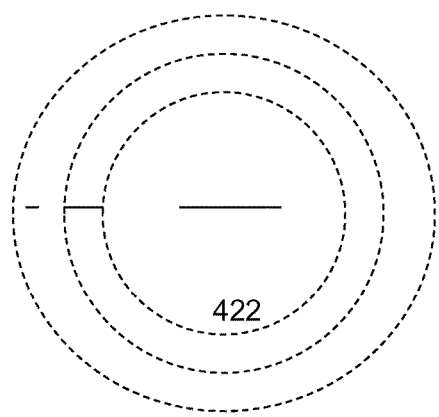
FIG. 4B shows an exemplary scheme of presenting a non-linearly scaled map.
Figure 4C:
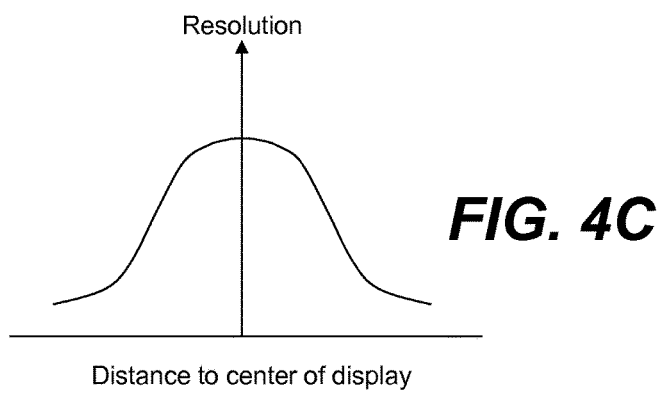
FIG. 4C shows a corresponding resolution curve to show the nonlinearity of the map being displayed on a screen, as a result, many objects near the center are clearly displayed in details.

In one embodiment, the audio is synched with the artistic map and indicates a turn when the current location needs to turn in accordance with the directions. In another embodiment, the audio also provides commentary on the features and history of a particular location, and entertaining, relevant, organized and themed heritage interpretation, etc. FIG. 4B shows an exemplary scheme of presenting a non-linearly scaled map. The center portion 422 of the screen 402 is more detailed than the surrounding areas. FIG. 4C shows a corresponding resolution curve to show the nonlinearity of the map being displayed on the screen 402. As a result, many objects near the center are clearly displayed in details.

The controller 406 includes a network interface 414 referred to as a RF interface that facilitates wireless communication with a GPS system. In one embodiment, the interface 414 is configured to act as a common interface to communicate with a server to receive a map data file about a particular place (e.g., a zoo, a resort, or a park).

Depending on implementation, the input interface 412 may include a number of function buttons and/or a screen graphical user interface (e.g., a touch screen). The input interface 278 allows a user to select or enter a destination. In one embodiment, a user is allowed to select an enlarged object being displayed to get directions. It should be pointed out that the present invention does not have to be only practiced on a GPS receiver. Other devices (e.g., a computing device, a hand-held device) may also be configured to practice the present invention.

Figure 5:
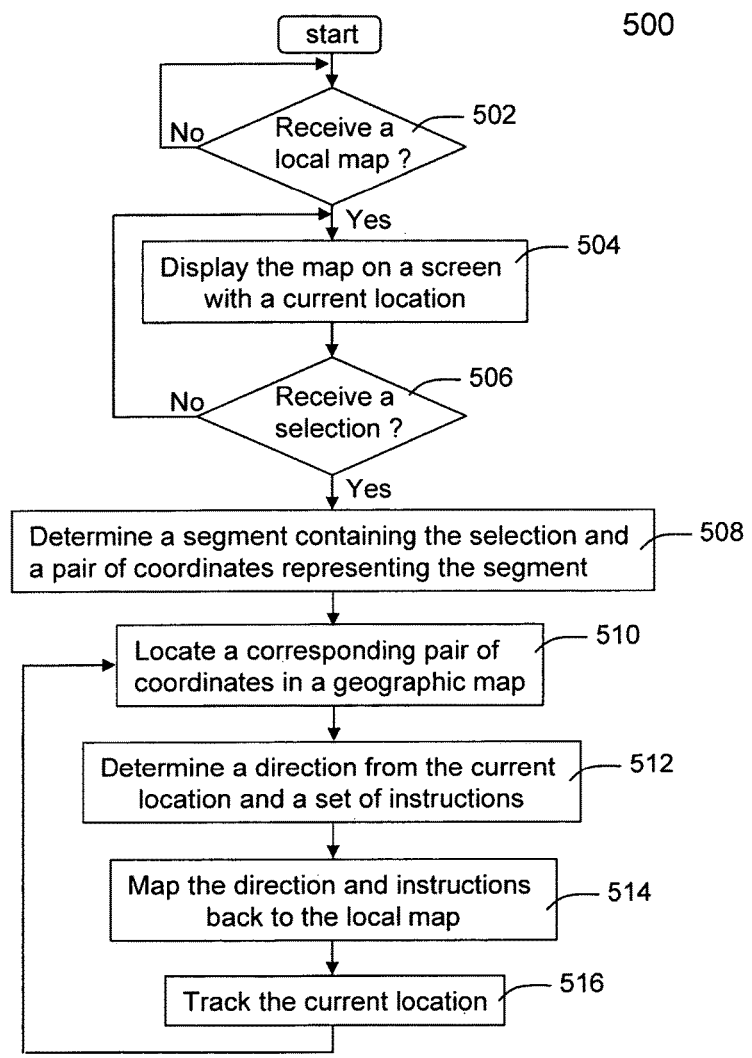
FIG. 5 shows a flowchart or process of navigating in a non-linearly scaled map.

FIG. 5 shows a flowchart or process 500 of navigating in a non-linearly scaled map. The process 500 may be implemented in software, hardware, or in a combination of both. At 502, the process 500 is awaiting a local map (e.g., the map 100 of FIG. 1) to be loaded. The local map is received into a portable device with GPS capability. The local map may be provided by a premise (e.g., a park) via wireless transmission (e.g., cellular, WiMAX, 802.11a/b/g, UWB or bluetooth) or a line connection (e.g., USB).

Upon receiving the local map, the process 500 goes to 504 to display the map on the portable device. Different from a regular map, the map is artistically represented. Objects or distances are nonlinearly scaled. In one embodiment, the objects are exaggeratedly shown to illustrate respective points of interest. At the same time, a current location of the device may be labeled on the map to show where it is in the map.

With the displayed map, a user of the device selects a point of interest as a destination at 506. The destination may be an exhibit exaggeratedly shown in the map. At 508, a segment representing the exhibit and a pair of coordinates representing the segment are determined. The segment may represent the shape of the exhibit. All points in the segment are represented by only one pair of coordinates.

At 510 the pair of coordinates in the map is translated into a pair of latitude and longitude in an actual geographic map. In operation, the latitude and longitude coordinates are understandable by the GPS so that the destination can be determined. At 512, a direction from the current location to the destination is determined. A set of instructions of how to get from the current location to the destination is also prepared. At 514, the direction and instructions are mapped in accordance with the local map so that the direction and instructions make sense in the local map. In one embodiment, the instructions are modified to optimize the route by introducing stops at several points of interest along the way so that the visitor may see the most without compromising the time to spend from the current location to the destination.

Once the direction and instructions are determined, the current location is tracked by the GPS at 516. It should be noted, in one embodiment, the current location is translated or mapped according to the original local map. As a result, the display showing the current location as well as the destination fit nicely in the local map despite of its nonlinearity.

A user of a GPS device showing a local artistic map needs to visualize the current position in the artistic map. While the current position is presented by the GPS device per a pair of geographic coordinates (longitude/latitude). According to one embodiment, a transformation from the geographic coordinates to image pixel coordinates is carried out to ensure that the current position or a destination is correctly presented in the artistic map. Since the artistic map can be very deformed and different from the corresponding real geographic map, different approaches may be applied for implementing such a transformation.

Figure 6A:
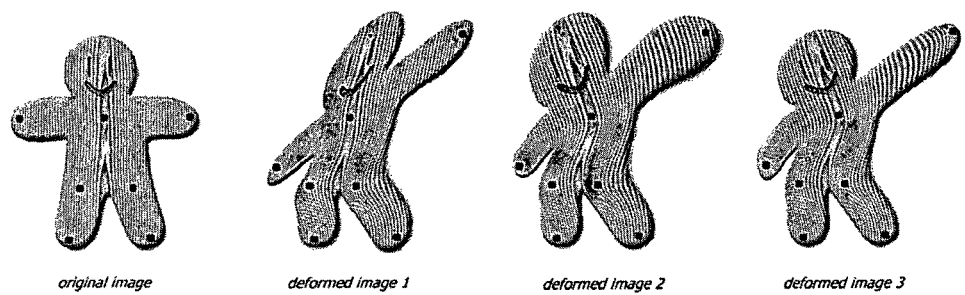
FIG. 6A shows an original image being transformed to three different deformed images via a plurality of control points.

One is to use image deformation techniques. For example, some deformation techniques use control points. Normally every control point has 2 pairs of coordinates associated with it. The first pair is pixel-coordinates in an original image and the second pair is the pixel-coordinates of a control point in a corresponding deformed image. In one implementation, the second pair is the coordinates (longitude, latitude) of the control point in the geographic map. Then the rest of the image is transformed by an algorithm that uses control points:

FIG. 6A shows an original image being transformed to three different deformed images via a plurality of control points. It should be noted that how an image is transformed is not important, what is important is the transformation itself. One advantage of the transformation using the control points is that some transformations can be achieved with very few control points. The number of control points represents the amount of manual work that has to be done to import the artistic map into a GPS device. The transformation is exact for every control point, but can be quite inaccurate for the rest of the pixels. In general, the more control points are presented, the more accurate the transformation can be.

Figure 6B:
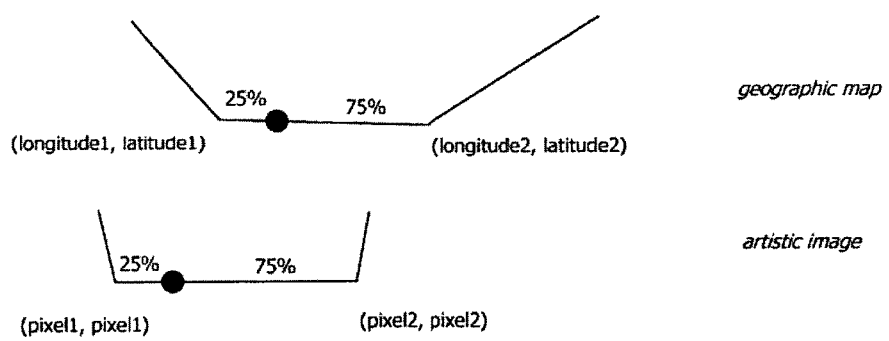
FIG. 6B shows another transformation to transform the pixel coordinates (artistic image coordinates) of every node and shape point of a road network in a geographic map to an artistic map.

FIG. 6B shows another transformation to transform the pixel coordinates (artistic image coordinates) of every node and shape point of a road network in a geographic map to an artistic map. Since a position of a user is map matched to a part of the road network, the pixel coordinates of the position can be obtained by interpolating the pixel coordinates of the end points of the map matched part of the road network.

In one embodiment, visualization of the route (namely the user has to follow) on an artistic map is realized as follows: the points of the route belong to a road network, so the pixel coordinates of every point can be used in the above embodiment to transform the geographic coordinates to the image coordinates. Then lines connecting the pixel coordinates of the points for the route can be drawn.

Figure 6C:
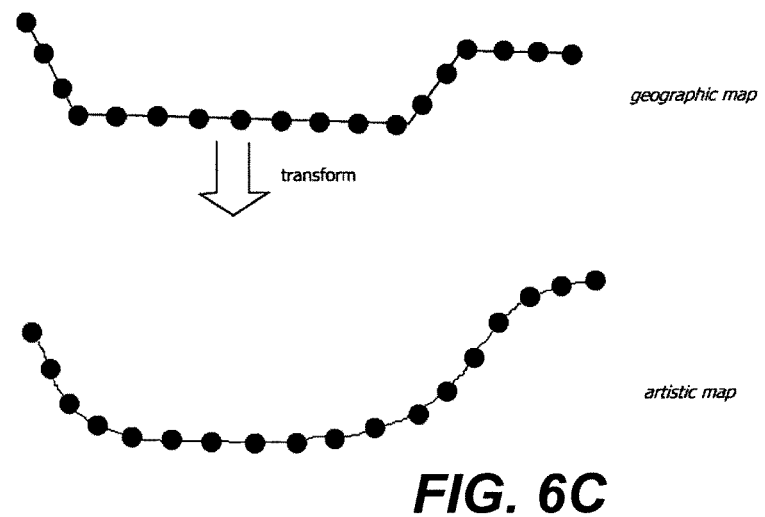
FIG. 6C shows alternatively a route being converted into a sequence of points and these points being transformed to image pixel-coordinates and then connected with lines.

Alternatively, the route may be converted into a sequence of points (for example evenly distributed—the distance between 2 points is constant) and these points are transformed to image pixel-coordinates and then connected with lines, as shown FIG. 6C.

Nearly all GP receivers have a display screen. Different display screens represent a colorful map differently. In one case, an artistic map with lakes and streams that are drawn in blues may be displayed as a map with lakes and streams in green. Such color distortions are often observed and due to the facts that each manfacturer of the display screen or the GPS receivers sets the display colors differently. Some distortions are caused by the backlighting and others are caused by the color maps. One aspect of the present invention is to provide a mechanism that faciliates a color setting by each individual manfacturer without asking a provider of the application module per the present invention to test the color requirement for each of the manfacturers again and again.

In one embodiment, an artifical map is provided. Depending on the number of objects to be displayed in a map, the artifical map presents an artifical scene including all the objects. For example, there are 5 items to be shown in a map, such as all highways, all local major roads, all hospitals, all lakes, and all golf courts. An artifical scene is then created to include all of the five objects, the color of each of the objects may be changed (e.g., via a bitmap image). The artifical map may be preapred to include any number of objects, items or landmarks. When the artifical scene is displayed on a particular GPS receiver, the manfacturer of the GPS receiver can adjust the respective colors to suit the display screen of the GPS receiver. The revised artifical map is referred to as a color-definition map, which depending on implemantion may be exported to a file or color reference attributes.

The application module loaded in the GPS receiver is configured to determine whether there is a revised color-definition map (or a color file or color reference attributes). If there is one, the application module reads in the parameters that overwrite the original default parameters. When given a pair of coordinates, the application module draws the map per updated parameters. For example, coordinates (10, 19) represent a golf course, the application module determines what color is for a golf course in reference to the updated parameters. Should there be no such updated parameters, all objects are drawn in default.

The processes, sequences or steps and features discussed above are related to each other and each is believed independently novel in the art. The disclosed processes and sequences may be performed alone or in any combination to provide a novel and unobvious system or a portion of a system. It should be understood that the processes and sequences in combination yield an equally independently novel combination as well, even if combined in their broadest sense; i.e. with less than the specific manner in which each of the processes or sequences has been reduced to practice.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

We claim:

1. A method for navigating in a particular area, the method comprising:

downloading from a network into a computing device an artistic map, the artistic map being non-linearly scaled and including various objects being exaggeratedly shown on the computing device to facilitate a user using the computing device to view and select one of the objects to navigate thereto in the artistic map, wherein the computing device is portable, equipped with navigation capability and provides a traveling guidance based on a geographical map, the artistic map is not used directly by the computing device for navigation, each of the objects is represented by a plurality of points on a display of the computing device, and the geographical map is not being displayed on the display;

receiving in the computing device a selection on the one of the objects from the user as a selected object;

determining by the computing device a pair of coordinates for one of the points on the selected object;

transforming in the computing device the pair of coordinates to a physical point represented by a pair of latitude and longitude in the geographical map not being shown on the display, the points representing the selected object having different pairs of coordinates, but all of the different pairs of coordinates for the selected object corresponding substantially to the physical point when said transforming is performed;

detecting a current location of the computing device in the geographical map;

determining according to the geographical map a navigational direction from the current location to the one of the objects being selected; and showing the navigational direction on the artistic map being displayed.

2. The method as recited in claim 1, wherein the artistic map is a theme park map, each of the objects represents an attraction.

3. The method as recited in claim 1, wherein the map is presented in such a way that a display resolution of the map goes lower from a center of the display to an edge of the display.

4. The method as recited in claim 1, wherein said showing the navigational direction on the artistic map being displayed comprises transforming in the computing device the navigational direction based on the geographical map to a navigation direction based on the artistic map.

5. The method as recited in claim 4, further comprising determining a set of instructions of how to move from the current location to the physical point as a destination.

6. The method as recited in claim 5, wherein said showing the navigational direction on the artistic map being displayed comprises:
transforming the instructions with respect to the geographical map to the artistic map being displayed.

7. The method as recited in claim 6, wherein the navigational direction shows how to move from the current location to the destination among a route, points of the route belonging to a road network, so pixel coordinates of each of the points are used to transform geographic coordinates of the points to image coordinates of the points.

8. The method as recited in claim 7, further comprising connecting the pixel coordinates of the points to show the route on the map.

9. The method as recited in claim 5, wherein said showing the navigational direction on the artistic map being displayed is carried out according to a transformation derived from a deformation of the geographical map to the artistic map being displayed.

10. The method as recited in claim 1, wherein there is a color map to define a color of each of the objects in the artistic map, and the method further comprising: adjusting the color for the each of objects in the artistic map, and generating a color definition map.

11. A portable device for navigating a designated place, the portable device comprising:
a display screen configured to display an artistic map downloaded from a network, the artistic map being non-linearly scaled and including various objects being exaggeratedly shown therein, each of the objects represented by a plurality of points, wherein the portable device is equipped with navigation capability and provides a traveling guidance based on a geographical map, the artistic map is not used directly by the portable device for navigation, and wherein the geographical map is not being shown on the display screen;
a memory for storing code;
a processor executing the code to perform operations of:
determining a pair of coordinates of one of the points representing an object being selected in the artistic map being displayed on the display screen;
transforming the pair of coordinates of the one of the points to a physical point represented by a pair of latitude and longitude in the geographical map not being shown on the display, wherein the points representing the object have different pairs of coordinates, but all of the different pairs of coordinates correspond substantially to the physical point;
detecting a current location of the computing device in the geographic map;
determining according to the geographical map a direction from the current location to the physical point; and
showing the direction in the artistic map being displayed.

12. The portable device as recited in claim 11, wherein the selected object is represented by a plurality of pairs of coordinates, all of the pairs of coordinates are substantially transformed to the physical point represented by the latitude and longitude.

13. The portable device as recited in claim 12, wherein the artistic map is non-linearly scaled, where the physical point is located in the geographical map in accordance with the latitude and longitude.

14. The portable device as recited in claim 13, wherein the determining of the direction from the current location to the physical point is carried out by the portable device in accordance with the geographical map.

15. The portable device as recited in claim 14, where the operations further comprises determining a set of instructions of how to move from the current location to the physical point as a destination.

16. The portable device as recited in claim 15, wherein said showing the direction in the artistic map being displayed comprises:
transforming the direction with respect to the geographical map to the artistic map being displayed; and
transforming the instructions with respect to the geographical map to the artistic map being displayed.

17. The portable device as recited in claim 16, wherein the direction shows how to move from the current location to the destination among a route, points of the route belong to a road network, so pixel coordinates of every of the points are used to transform geographic coordinates of the points to image coordinates of the points.

18. The portable device as recited in claim 17, wherein the operations further comprises connecting the pixel coordinates of the points to show the route in the artistic map.

19. The portable device as recited in claim 15, wherein the synchronizing of the direction with the artistic map being displayed is carried out according to a transformation derived from a deformation of the geographical map to the map being displayed.

20. The portable device as recited in claim 11, wherein colors of various objects are displayed thereon in accordance with a color definition map that is generated after an adjustment of the colors originally produced according to a color map.

* * * * *